United States Patent

Ambs et al.

[11] Patent Number: 5,978,316
[45] Date of Patent: Nov. 2, 1999

[54] MARINE SEISMIC SOURCE

[75] Inventors: Loran D. Ambs, Fulshear; John J. Sallas, Plano, both of Tex.

[73] Assignee: Western Atlas International, Inc., Houston, Tex.

[21] Appl. No.: 08/940,088

[22] Filed: Sep. 29, 1997

[51] Int. Cl.[6] .................................................. H04B 11/00
[52] U.S. Cl. ............................ 367/134; 367/87; 367/117; 367/131; 181/120
[58] Field of Search ..................................... 367/114, 134, 367/87, 117, 131; 114/44; 181/110, 120

[56] References Cited

U.S. PATENT DOCUMENTS

| | | | |
|---|---|---|---|
| 3,329,930 | 7/1967 | Cole et al. | 340/17 |
| 3,349,367 | 10/1967 | Wisotsky | 367/26 |
| 3,384,868 | 5/1968 | Brown et al. | 340/8 |
| 3,401,660 | 9/1968 | Strange et al. | 114/5 |
| 4,153,135 | 5/1979 | Bouyoucos | 181/120 |
| 4,207,962 | 6/1980 | Bouyoucos | 181/119 |
| 4,463,451 | 1/1988 | Warmack et al. | 181/110 |
| 4,486,864 | 7/1981 | Ongkiehong et al. | 181/110 |
| 4,635,747 | 1/1987 | Bird, Sr. et al. | 181/120 |
| 4,695,012 | 9/1987 | Lindenbaum . | |
| 4,932,006 | 6/1990 | Delignieres | 367/134 |
| 4,942,557 | 5/1983 | Seriff | 181/110 |
| 4,974,216 | 4/1971 | Elliot | 181/110 |
| 5,008,845 | 4/1991 | Adock . | |
| 5,584,047 | 12/1996 | Tuck . | |

*Primary Examiner*—Christine K. Oda
*Assistant Examiner*—Anthony Jolly
*Attorney, Agent, or Firm*—Alan J. Atkinson

[57] ABSTRACT

A seismic acoustic signal source includes a hull that has a wetted surface in contact with a body of water. When underway, the draft of the hull is substantially zero. An acoustic signal generator is provided with a linear actuator that is resiliently mounted in the hull. The linear actuator is acoustically coupled to the hull bottom such that when the signal generator is activated, the hull radiates an acoustic wavefield into the water.

11 Claims, 3 Drawing Sheets

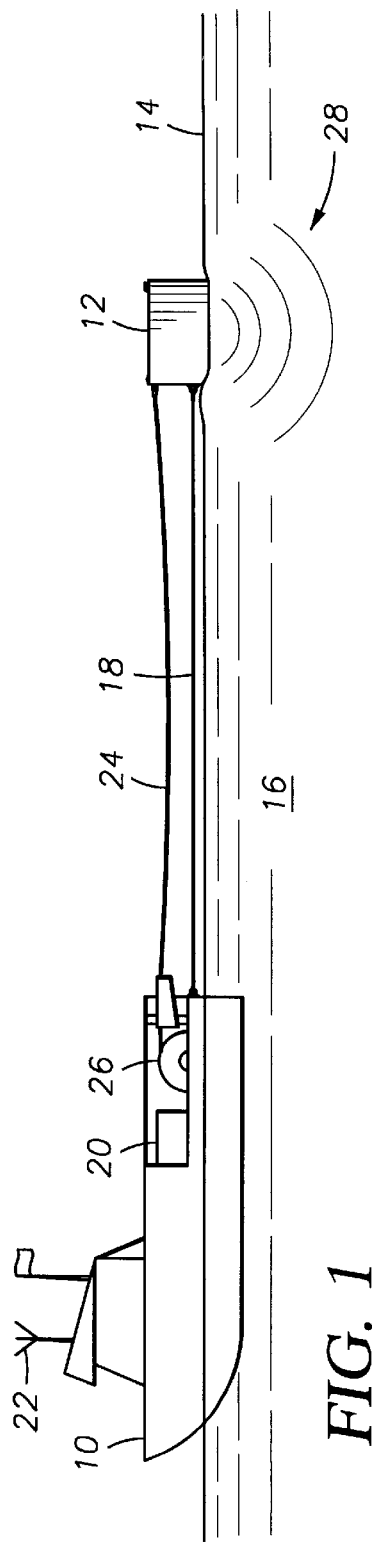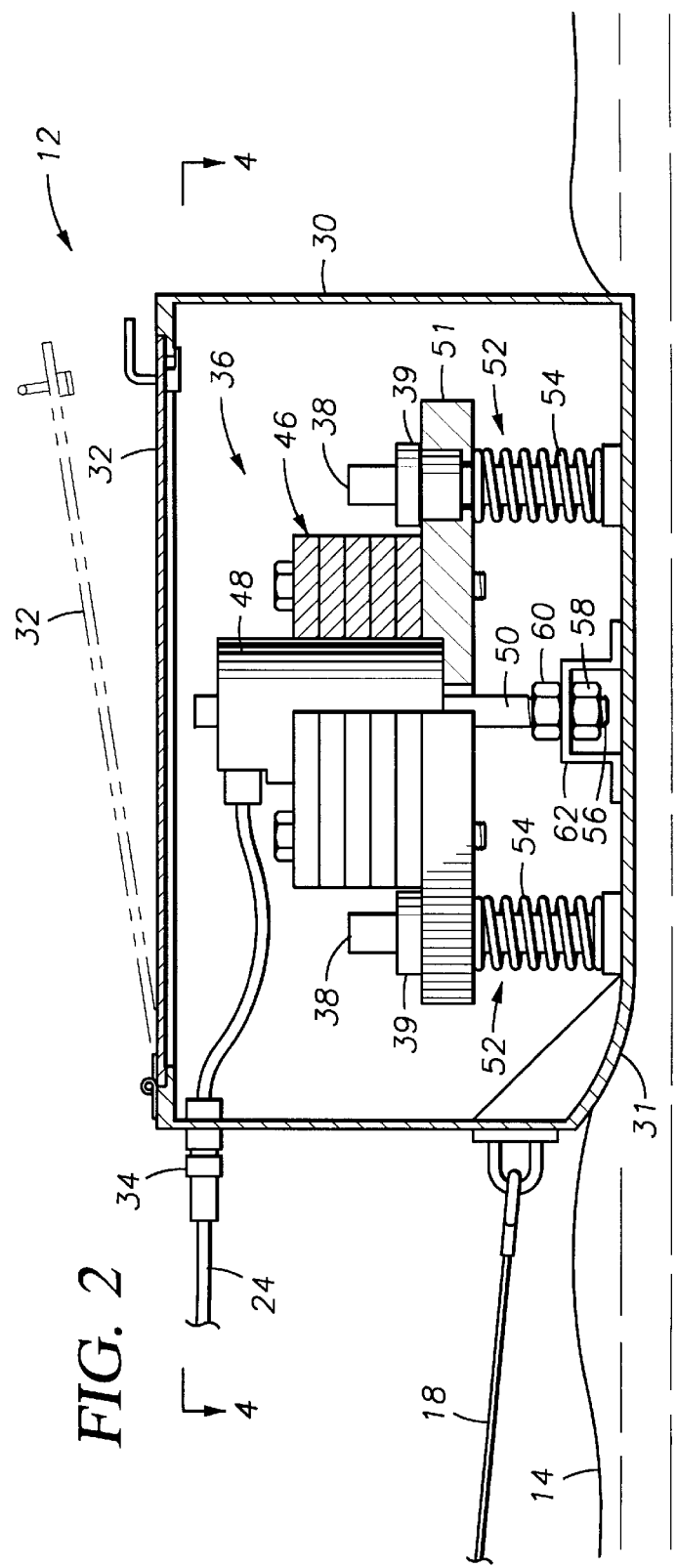
FIG. 1
FIG. 2

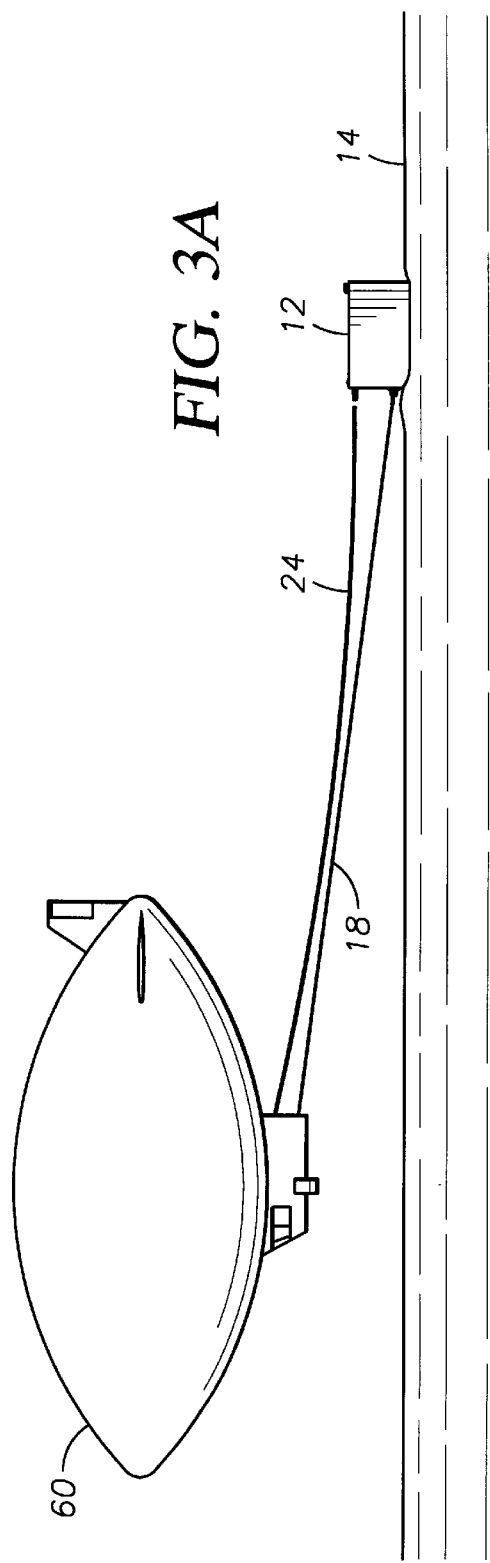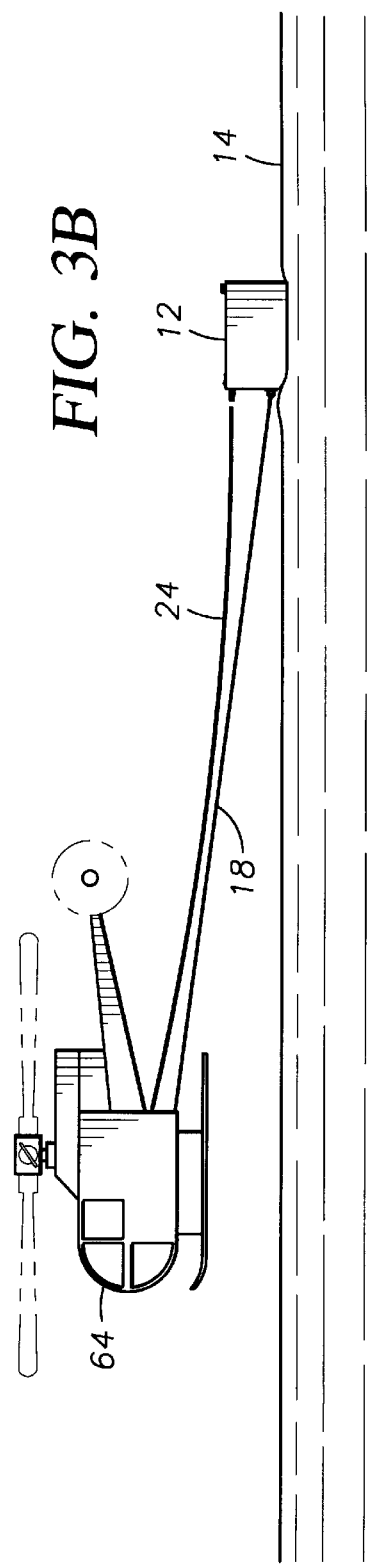

MARINE SEISMIC SOURCE

BACKGROUND OF THE INVENTION

1. Field of the Invention

A marine seismic acoustic signal generator is installed in a small, substantially zero-draft marine support vehicle that is usually towed behind a service ship in a body of water. In operation, the entire vehicle becomes an acoustic wavefield generator.

2. Discussion of Related Art

As is well known to geophysicists, a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to the surface to be received by seismic sensors (receivers). The seismic sensors are located at designated stations at or near the surface of the earth. The seismic sensors convert the mechanical earth motions (or water-pressure variations in a marine environment), due to the reflected wavefield, to electrical signals. The resulting electrical signals are transmitted over a signal-transmission link of any desired type, to instrumentation, usually digital, where the seismic data signals are archivally stored for later processing. The travel-time lapse between the emission of a wavefield by a source and the reception of the resulting sequence of reflected wavefields by a receiver, is a measure of the depths of the earth formations from which the respective wavefields were reflected.

The seismic survey stations of a 3-D survey are preferably distributed in a regular grid over an area of interest with inter-station spacings on the order of 25 meters. The processed seismic data associated with a single receiver location are customarily presented as a one-dimensional time scale recording displaying rock layer reflection amplitudes as a function of two-way wavefield travel time. A plurality of seismic traces from a plurality of receivers distributed sequentially along a line of survey may be formatted side-by-side to form a model of a cross section of the earth (two-dimensional tomography). Seismic sections from a plurality of intersecting lines of survey distributed over an area of interest, provide three-dimensional tomography.

At sea, in deep water, the sensors are mounted in one or more streamer cables and towed through the water by a cable ship. In relatively shallow water, the sensors and their connecting cables are laid on the sea floor from a service boat. Alternatively, in shallow water and the transition zone (the surf), the sensors may be associated with instrumented buoys. All of these techniques are well known to the art and need not be dwelt upon further.

In marine operation, a service (shooting) ship tows an acoustic source such as an array of air guns, a chirp signal generator or other device through the water over the region to be surveyed. As it visits each survey station, the source is triggered to generate a desired wavefield. One such device is disclosed in U.S. patent application Ser. No. 3,384,868, issued May 21, 1968 to G. Brown et al., which is incorporated herein by reference. This is an apparatus for the generation of seismic energy waves within a water medium which consists of a rigid frame member and suspension attachments, the frame member movably securing a piston plate between upper and lower sealed bellows which are alternately pressurized by reciprocal oil flow to vibrate the piston plate relative to the frame member, the apparatus also including the employ of additional bellows which is sealed between the piston plate and frame member to receive varying air pressure to thereby maintain static-pressure balance.

A somewhat similar device is taught by U.S. Pat. No. 3,329,930, issued Jul. 4, 1967 to Jimmy R. Cole et al. This source is a submerged hydraulic vibrator having an inverted bell-shaped body member closed on the bottom by a flexible plate. An hydraulic servo valve, mounted in a cylindrical housing secured to the body member, vibrates a piston that is coupled to the flexible bottom plate. The assembly is designed to be towed through the water, imparting vibratory signals thereto at selected survey stations.

The drag produced by the towed sources necessarily slows down the shooting ship, reducing the production rate of stations occupied per unit time and is therefore costly. It would appear to be useful to incorporate the acoustic source into the structure of the shooting ship itself in a streamlined configuration.

One such system was disclosed in U.S. Pat. No. 3,401,660, issued Sep. 17, 1968 to Booth B. Strange et al. for a Seismic Ship. Here, wells on the order of eight feet in diameter extend from the working deck through the ship's bottom, opening into the water. By means of a crane, a suitable sound source is lowered into the well flush with the hull, but immersed in the water. Either a chirp-signal generator or an impulse-type source was used.

The disadvantage of that particular arrangement was the need for totally-enclosed, sealed sound sources and the wells, open to the sea penetrating the ship's hull. The devices were unwieldy, had a tendency to protrude beneath the hull and were difficult to service during active operations by reason of their total immersion. Furthermore, each time the source was activated, the ship was severely shaken which threatened its structural integrity.

A number of marine sources are known which rely upon a pair of opposing pistons mounted in a sleeve that are initially in intimate contact. The pistons are, by hydraulic or electro-hydraulic means, caused to abruptly expand outwardly from each other, against a volume of water, to radiate a wavefield in the water. The wavefield may be periodic, impulsive or implosive. Typical of such sources is described in U.S. Pat. No. 4,153,135, issued May 8, 1979 to John Bouyoucos for an APPARATUS FOR THE GENERATION OF ACOUSTIC SIGNALS IN MARINE ENVIRONMENTS. Several similar types of marine sources are illustrated in another Bouyoucos U.S. Pat. No. 4,207,962, issued Jun. 17, 1980.

Underwater acoustic sources towed through the water experience hydrodynamic drag which slows progress and increases operational expenses. Submerged mechanical acoustic sources also require watertight integrity of the components, both mechanical and electrical, which increases production and maintenance expenses. Furthermore, most submerged vibratory acoustic sources require that the pressure of the interior of the device be equalized with the ambient water pressure in order for the device to operate properly. A significant problem with underwater towed marine sources is the first ghost reflection from the water surface, which produces notches in the farfield power spectrum.

SUMMARY OF THE INVENTION

A seismic acoustic source for use in a body of water, comprises in combination, a marine surface support vehicle having a hull. The marine vehicle is characterized by substantially zero draft. An acoustic signal generator is resiliently mounted in the hull and is acoustically coupled to the hull bottom by a spring/mass system. A remotely-located means provides triggering signals and power to the acoustic signal generator through an umbilical tether. In operation, when triggered, acoustic signal generator causes the hull to radiate a wavefield into the water against the inertia of the reaction mass.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 1 shows a ship towing a marine source support vehicle;

FIG. 2 is a cutaway side view of the acoustic signal generator resiliently coupled to the hull of the marine source support vehicle;

FIGS. 3A AND 3B show the marine surface support vehicle being towed by various types of airships.

DETAILED DESCRIPTION OF THE PREFERRED EMBODIMENT

Figure 4:
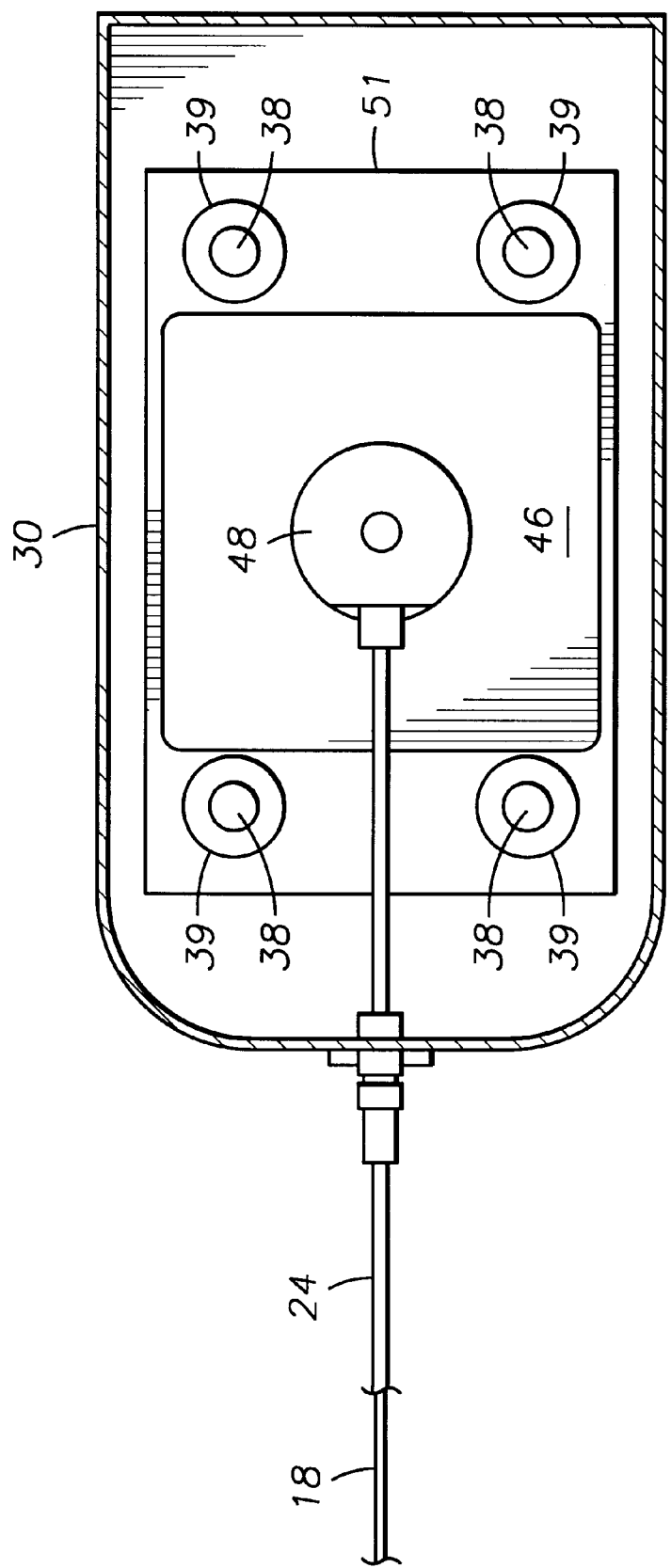
FIG. 4 is a plan view of the interior of the surface support vehicle along line 4—4 of FIG. 2.

Please refer to FIG. 1 where there is shown a ship 10 towing a seismic source in a surface support vehicle 12 over the surface 14 of a body of water 16 by towline 18.

Instrumentation 20 mounted on/in a service ship 10 receives navigation information through antenna 22 from a GPS satellite swarm. The seismic acoustic signal generator in surface support vehicle 12 is triggered by a signal transmitted from instrumentation 20 on service ship 10, over an umbilical line 24. The trigger command may be issued on the basis of absolute geographic positioning provided by the GPS/integrated navigation system, fixed-distance intervals, fixed time intervals, or manual commands. Upon command from instrumentation 20, the acoustic signal generator, next to be described, causes the entire wetted surface of a hull member, 30, (to be described later) of surface support vehicle to oscillate along a vertical axis thereby to radiate a pressure wavefield, generally shown symbolically as 28, into the water to insonify the earth in a manner well known to the art.

Please refer now to FIGS. 2 and 4. FIG. 2 is a side view of acoustic-source support vehicle 12 with one side cut away to show the configuration of the interior. FIG. 4 is a plan view of the interior of vehicle 12 along lines 4—4. Support vehicle 12 includes a hull member 30 having a hinged access hatch 32 that can be sealed shut against water invasion during operation at sea. The bottom 31, of hull 30 is in oscillatory contact with the water 16. A suitable watertight receptacle, 34, at the prow of vehicle 12 receives the outboard end of umbilical line 24. The construction of umbilical line 24 depends upon the type of signal generator to be used as the acoustic source.

The signal generator may be driven hydraulically, pneumatically, electromagnetically, electrostatically, chemically or purely mechanically such as by means of rotating eccentric weights. The source operation may be selected to be characterized as a compressive-impulsive, a swept-frequency, a continuous-wave or an imploder-type device. By way of example but not by way of limitation, the operation of the acoustic signal generator will be described herein in terms of a hydraulic vibrator of any well-known type.

Resiliently mounted in hull 30 is an exemplary vibratory acoustic source generally shown as 36. The vibratory acoustic source 36 is supported inside hull 30 by a compliant subsystem 52 (to be described later) which allows vertical movement of source 36 but inhibits rotational and/or horizontal motion relative to the hull 30 and minimizes horizontal stresses on the source actuator shaft 50. In a preferred embodiment, the source support-plate 51 includes linear bearings 39 of any desired type that slide on guide rods 38 which, in turn are secured by any convenient means to the bottom 31 of hull 30. Any other desired means may be used to constrain source 36 to vibrate exclusively along a vertical axis while minimizing undesirable vibrations along other axes.

The active exemplary vibrator element 48 may be a reciprocating hydraulic linear actuator, such as described in FIG. 3 of the '868 patent cited earlier, which has two exposed ends of a double-sided hydraulic piston rod 50 shown schematically in FIG. 2. The lower end of piston rod 50 is fixedly coupled to the hull bottom 31 in any convenient manner. In one such arrangement, piston rod 50 may be provided with a threaded end 56. Nuts 58 and 60 at the lower end of the piston rod rigidly secure piston rod 50 to a bracket or a rib 62 fastened to bottom 31. In alternate arrangement (not shown), piston rod 50 is provided with a bore for receiving a threaded tie rod which is adapted to bolt to actuator 48 to the hull bottom 31.

The reaction mass taken as a whole, consists of a base plate 51 that supports a mass 46 which may be composed of a stack of laminated steel plates so that the total mass may be adjustable for tuning purposes. The reaction mass 46 is supported above the hull 31 by a compliant coupling system generally shown as 52 comprising a number of resilient members in parallel, such as 54. In a preferred embodiment, the compliant coupling system may employ a set of four or more compression springs, two of which are shown in FIG. 2, the other two being hidden from view. The compliant members are positioned between the reaction mass and the bottom 31 of surface support vehicle 12. More or fewer springs may be used as desired. The springs 54 fit around guide rods 38 which provide compliant-coupling attachment between the reaction mass 46 and the bottom 31 of the support vehicle. The linear bearings 39 ensure smooth motion of the vibrator relative to the guide rods 38 during operation. Other compliant means such as air bags could also be used in place of springs.

The compliant coupling system 52 serves as a means for supporting the acoustic source 36 when at rest as well as serving as a means for tuning the resonance of the spring/mass system represented by signal generator 36 taken as a whole. The bottom, 31 of hull 30 is heavily reinforced by any desired means to withstand the shock forces when signal generator 36 is activated. Any other well-known commercially-available support means may be used, such as a modification of the acoustic isolator provided by Industrial Vehicles International Inc. of Tulsa Okla. as disclosed in U.S. Pat. No. 4,636,747, issued Jan. 13, 1987 to J. M. Bird et al.

The basic spring/mass system includes reaction masses 46, liner actuator assembly 48, guide rods 38 and compliant coupling system 52. Additional fine-tuning capability may be provided by use of ballast tanks (not shown) associated with reaction masses 46 for adjusting the total mass of generator 36 with water ballast.

Assuming that the acoustic signal generator 36 is hydraulically driven, umbilical line 24 will include hydraulic-fluid pressure and return lines as well as electrical command-signal and power lines which enter source-support vehicle 12 through receptacle 34 from service ship 10 and thence to the active parts of signal generator 36.

Optionally, an electrically-driven hydraulic system could of course be installed directly on support vehicle 12 instead of on service ship 10 although that arrangement is not shown in the drawings. In that case electrical signal and power lines but not hydraulic lines would be required in the umbilical line.

In operation, seismic signal generator 36 drives the entire wetted surface of hull 30 of surface support vehicle 12 against the inertia of reaction mass 46 so that the support vehicle, 12, itself becomes an acoustic wavefield radiator.

It is contemplated that support vehicle 12 be characterized by a minimal, substantially zero draft in the water when underway. Thus, support vehicle 12 will be designed to skim the water surface with minimal drag when under tow. Assuming that the combined mass of hull 30 and signal generator 36 is about 3 tons or less, a square barge-like vehicle measuring about 10 feet per side would draw less than a foot of (salt) water at rest and much less when underway. Other shapes may be used as desired. Support vehicle 12 may be provided with a low-profile keel for towing stability if needed.

Although optional, surface support vehicle may be self-propelled, it is preferably towed by a service ship, particularly if several surface support vehicles are to be used to form an array of sources.

In addition to towing from a water-borne service ship, it is contemplated that the surface support vehicle 12 could also be towed by an airship, such as an aerostat 60 or a helicopter 64 as shown in FIGS. 3A and 3B, to provide a means for exploring more territory per unit time. In that case, of course it might be preferable for the seismic signal generator 36 to be driven electromagnetically.

There are many advantages to using the surface support vehicle 12 itself as a seismic acoustic signal radiator. Since the mechanisms of the seismic acoustic signal generator are not submerged but are readily accessible from the surface, maintenance is greatly simplified. The relatively small size of the individual units allows a number of surface support vehicles to be harnessed together in an array. Towing forces are reduced because the surface support vehicles are designed to skim the water surface when under tow, rather than to be dragged through the water beneath the surface thereof. Since wavefield radiation is initiated virtually at the water surface, ghost reflections are eliminated.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A seismic acoustic source for use in a body of water, comprising in combination:

a marine surface support vehicle including a hull having a wetted surface, wherein said surface support vehicle is characterized by substantially zero draft when underway;

an acoustic signal generator, including a reaction mass, compliantly coupled acoustically to said hull; and means for triggering said acoustic signal generator to execute an operating cycle, thereby to cause the entire wetted surface of said hull to radiate a wavefield into the water relative to said reaction mass so as to insonify geologic formations underlying the water during execution of said operating cycle.

2. The seismic acoustic source as defined by claim 1, wherein said acoustic signal generator is a chirp signal generator.

3. The seismic acoustic source as defined by claim 1, wherein said acoustic signal generator is a compressional-wave generator.

4. The seismic acoustic source as defined by claim 1, wherein:

said marine surface support vehicle is self-propelled.

5. The seismic acoustic source as defined by claim 1, wherein:

said marine surface support vehicle is deployed by an aerostat.

6. The seismic acoustic source as defined by claim 4, comprising:

means mounted on said marine surface support vehicle for identifying the geographic position thereof.

7. The seismic acoustic source as defined by claims 1, wherein:

said marine surface support vehicle is towed by a marine service ship.

8. The seismic acoustic source as defined by claim 1, further comprising:

means for tuning the resonant characteristics of said seismic acoustic source.

9. The seismic acoustic source as defined by claim 1 wherein:

said marine surface support vehicle is towed by a helicopter.

10. The seismic acoustic source as defined by claim 1, wherein:

said acoustic signal generator is an imploder.

11. A seismic acoustic source for use in a body of water, comprising in combination:

a marine surface support vehicle including a hull having an interior, the hull including a wetted-surface portion, the support vehicle being characterized by substantially zero draft when underway;

an acoustic signal generator mounted inside the hull, the acoustic signal generator including a reaction mass, compliantly coupled acoustically to said hull; and means for triggering said acoustic signal generator to execute an operating cycle, thereby to cause the entire wetted-surface portion of said hull to radiate a wavefield into the water relative to said reaction mass so as to insonify the subsurface during execution of said operating cycle.

* * * * *